United States Patent [19]

Young

[11] E Re. 29,149

[45] Reissued Mar. 8, 1977

[54] PRODUCTION OF AMMONIUM PHOSPHATES AND PRODUCT THEREOF

[75] Inventor: Donald C. Young, Fullerton, Calif.

[73] Assignee: Union Oil Company of California, Brea, Calif.

[22] Filed: July 3, 1967

[21] Appl. No.: 653,602

Related U.S. Patent Documents

Reissue of:

[64] Patent No.: 3,044,851
Issued: July 17, 1962
Appl. No.: 116,161
Filed: June 9, 1961

U.S. Applications:

[63] Continuation of Ser. No. 264,008, Feb. 11, 1963, abandoned, said Ser. No. 116,161, is a division of Ser. No. 51,047, Aug. 22, 1960, Pat. No. 3,192,013, which is a continuation-in-part of Ser. No. 649,287, March 29, 1957, abandoned, and Ser. No. 666,479, June 18, 1957, abandoned, and Ser. No. 672,558, July 18, 1957, abandoned.

[52] U.S. Cl. ..... 423/313; 71/1; 71/34; 71/36; 71/40; 71/43; 71/44; 423/315; 423/317

[51] Int. Cl.[2] ..... C01B 25/28

[58] Field of Search ..... 23/107–109, 23/165; 71/37–39, 40–43; 423/313, 315, 317

[56] References Cited

UNITED STATES PATENTS

| | | | |
|---|---|---|---|
| 1,078,887 | 11/1913 | Wilson | 23/165 |
| 1,115,044 | 10/1914 | Washburn | |
| 1,879,204 | 9/1932 | Guillisen | |
| 2,415,797 | 2/1947 | Low | |
| 2,792,286 | 5/1957 | Wordie et al. | |
| 2,799,569 | 7/1957 | Wordie et al. | |
| 3,015,552 | 1/1962 | Striplin et al. | |

FOREIGN PATENTS OR APPLICATIONS

| | | | |
|---|---|---|---|
| 467,843 | 6/1937 | United Kingdom | |
| 6,321 | 1/1954 | Germany | 23/165 D |
| 855,104 | 11/1952 | Germany | 23/165 D |

OTHER PUBLICATIONS

"Proceedings of the Liquid Fertilizer Conference," June 11, 1959, Tennessee Valley Authority, Division of Chemical Development, pp. 17–20, 26–30, 52–54.

Waggaman, "Phosphoric Acid, Phosphates, and Phosphatic Fertilizers," 2nd ed., 1952, Reinhold Pub., New York, p. 229.

*Primary Examiner*—Herbert T. Carter
*Attorney, Agent, or Firm*—Richard C. Hartman; Lannas S. Henderson

[57] ABSTRACT

Ammonium phosphate solutions free of precipitates are prepared from wet-process phosphoric acid containing incidental metallic impurities such as iron, aluminum and magnesium by concentration of the phosphoric acid to an anhydrous state and the formation of acyclic polyphosphoric acids therein which prevent the precipitation of the metallic impurities upon neutralization. The acid is heated to a temperature greater than 120° C. at atmospheric or subatmospheric pressures while removing the volatile impurities and thereafter is neutralized with ammonia. The neutralization step can be performed at elevated temperatures with anhydrous ammonia or the acid can be cooled and neutralized at ambient temperatures. The resulting ammonium phosphate is diluted with water to obtain an ammonium phosphate solution which is clear and free of precipitates.

6 Claims, 8 Drawing Figures

INVENTOR.

BY DONALD C. YOUNG

Robert C. Thomas

ATTORNEY

INVENTOR.
DONALD C. YOUNG
BY Robert E. Strauss
ATTORNEY

INVENTOR.
DONALD C. YOUNG
BY Robert E. Strauss
ATTORNEY

INVENTOR.

BY DONALD C. YOUNG

Robert E. Shaw

ATTORNEY

INVENTOR.
DONALD C. YOUNG
BY
Robert E. Shaw
ATTORNEY

PRODUCTION OF AMMONIUM PHOSPHATES AND PRODUCT THEREOF

Matter enclosed in heavy brackets appears in the original patent but forms no part of this reissue specification; matter printed in italics indicates the additions made by reissue.

This application is a *continuation of my application Ser. No. 264,008 filed Feb. 11, 1963 and now abandoned for reissue of Letters Patent 3,044,851. Patent 3,044,851 issued on application Ser. No. 116,161 which is a* divisional application of my copending application, Ser. No. 51,047, filed Aug. 22, 1960 now U.S. Pat. No. 3,192,013, *which is a continuation-in-part of my parent applications 649,287 filed Mar. 29, 1957; 666,479 filed June 18, 1957; and 672,558 filed July 18, 1957 all now abandoned.*

This invention relates to a substantially anhydrous liquid phosphoric acid derived from wet process phosphoric acid and to the salts obtainable therefrom.

This invention also relates to phosphoric acid derived from wet process phosphoric acid comprising a non-equilibrated mixture of orthophosphoric acid, water acyclic polyphosphoric acid and to aqueous liquid salt solutions obtainable therefrom.

"Wet-process" phosphoric acid of commerce is manufactured by a process which, in essence, consists of treating phosphate rock (essentially calcium phosphate) with sulfuric acid, whereby there is formed free phosphoric acid and calcium sulfate. The latter, being insoluble, is separated from the acid by filtration. While this process is simple in concept, it is fraught with many technical difficulties and complications, and the resultant phosphoric acid product is a highly impure material, dark in color and containing relatively large amounts of dissolved sulfates and smaller amounts of fluorides, fluorosilicates and other salts of aluminum, magnesium, iron and other metals, as well as suspended organic matter.

This wet process acid is commonly produced and handled at concentrations between about 25 and 52 weight percent phosphorus calculated as the pentoxide. During the storage and shipment of the acid, some of the impurities present frequently precipitate and settle to the bottom of the container. These precipitates are objectionable and have resulted in a common practice for the supplier or manufacturer to bill the purchaser only for the amount of acid removed from the shipping vessel, the settled precipitate being returned.

The wet process acid as commonly produced and handled is also highly corrosive to mild steel at ambient temperatures and corrosive to most materials of construction, including stainless steels, at elevated temperatures. As a result, the acid is usually shipped in rubber or polyethylene lined containers and stored in lead, brick or rubber lined vessels.

The concentration of the acid as it is commonly handled is not the most economical for shipment because of the relatively large bulk of water which it contains. Previous attempts to manufacture and handle the acid in a more concentrated form have failed, frequently because the bulk of the acid solidified into a hard irrevertible mass. For this reason, the acid is commonly produced and handled as a dilute, corrosive liquid.

Because the wet process phosphoric acid as commonly produced contains fluorine it is unsuited for use as a source of phosphate in animal and poultry feed.

When such wet process acid is treated with ammonia to form aqueous ammonium phosphate solutions (for example, the fertilizer known as "8-24-0" which is an aqueous ammonium phosphate solution containing 8 percent (by weight) of nitrogen and 24 percent of phosphorus calculated as $P_2O_5$), the impurities present in the acid are thrown out of solution as gelatinous precipitates which are substantially impossible to separate from the aqueous phase by filtration or other conventional methods for separating solids and liquids. Such precipitated impurities in no way interfere with the fertilizing value of the ammonium phosphate (in fact, they are considered to have plant nutrient properties of their own), but they settle in the bottom of storage vessels and clog pipelines and the equipment used for applying the product to the soil. These impurities impart a thixotropic nature to the aqueous ammonium phosphate solution and frequently cause it to set up as a firm gel, preventing its handling in liquid form.

Previous attempts to obtain aqueous solutions of ammonium phosphate from wet process phosphoric acid have generally been directed to the purification of the acid, frequently by precipitation and removal of the impurities as insoluble salts. These methods have not been widely accepted because they are complex and costly to perform. They also reduce the nutrient value of the product from that of the acid by loss of phosphorus as well as removal of the precipitated impurities, themselves plant nutrients.

It is for these reasons that substantially all the ammonium phosphate made from wet process phosphoric acid is manufactured and marketed in solid form. However, the expense inherent in evaporating the aqueous material to form a dry product, together with the fact that such product is friable and hygroscopic and hence is difficult to package and store, have seriously limited the use of wet process acid for the manufacture of ammonium phosphate for fertilizer and other uses.

It is an object of this invention to obtain aqueous solutions of ammonium phosphate from wet process phosphoric acid which are useful as liquid fertilizers.

It is also an object of this invention to obtain a substantially anhydrous acid from wet process phosphoric acid which can be neutralized to form aqueous ammonium phosphate solutions and hard, nonhygroscopic solid ammonium salts.

It is a further object of this invention to obtain said substantially anhydrous phosphoric acid as a non-corrosive liquid.

I have discovered that iron and aluminum ions present as the predominant impurities in wet process phosphoric acid, form gelatinous precipitates which render ammonium salt solutions prepared therefrom thixotropic and gelatinous. Other metal ions incident as impurities in wet process phosphoric acid such as copper, chromium, magnesium, zinc ions, etc., form granular precipitates in ammoniacal solutions. I have further discovered that the formation of the gelatinous iron and aluminum precipitates can be prevented by heating the acid to expel the volatile impurities and thereafter forming acyclic polyphosphoric acid in the acid. The other metal impurities in the acid can be allowed to precipitate and be separated therefrom by a simple settling, centrifuging, or filtering step; preferably, however, the precipitation of these metals is also prevented by forming in the acid an additional quantity of the acyclic polyphosphoric acid.

I have also discovered that the tendency of the acid to deposit solids and to solidify into a hard, irrevertible mass can be obviated by concentrating the wet process acid to a substantially anhydrous phosphoric acid having an acyclic polyphosphoric acid content which is determined from the amount and identity of the impurities in a manner hereinafter described. This anhydrous phosphoric acid can be neutralized to form clear ammonium phosphate solutions which are free of precipitates. This anhydrous acid has also other highly beneficial properties hereinafter described.

Polyphosphoric acid is a generic term used to define the phosphoric acids having less water of constitution than orthophosphoric acid. Whereas orthophosphoric acid contains one atom of phosphorus per molecule and has a theoretical mol ratio of water to phosphorus pentoxide of 3.0 or greater, polyphosphoric acids have two or more atoms of phosphorus in a chain or ring structure in alternating sequence with oxygen, and a theoretical mol ratio of water to phosphorus pentoxide less than 3. Polyphosphoric acid has two general forms, the acyclic and the cyclic, commonly called metaphosphoric acid. In the acyclic form, which is derived by limited molecular dehydration of orthophosphoric acid, the individual chains of phosphorus and oxygen atoms have terminal ends and a theoretical mol ratio of water to phosphorus pentoxide between 2 and 3. In metaphosphoric acid, which is derived from the acyclic form by continued molecular dehydration, the chain is endless, forming structures. Metaphosphoric acids have theoretical mol ratios of water to phosphorus pentoxide of 2 or less. In practicing my invention, the acyclic species is formed by concentraion of the ortho form, however, the concentration or dehydration of the acid is stopped before the meta species is formed, since not only is this species ineffective in preventing the formation of precipitates in neutral salt solutions, but metaphosphoric acid forms salts with the metal impurities which are also insoluble in the acid.

The empirical formula for the desired acyclic polyphosphoric acid is:

$$H_{n+2}P_nO_{3n+1}$$

where:

H represents hydrogen

P represents phosphorus

O represents oxygen, and n is greater than 1.

When n=2, the species is commonly known as pyrophosphoric acid; when n=3, the species is tripolyphosphoric acid.

When the sole object is to obtain neutral salt solutions from wet process phosphoric acid which can be handled as liquids, two types of acid can be employed. The first type, hereinafter referred to as a non-equilibrated acid, comprises a mixture of the acyclic polyphosphoric acid, orthophosphoric acid and water present in an amount sufficient to hydrolyze the polyphosphoric acid to the ortho form. This acid can have an average or bulk concentration not materially greater than the wet process phosphoric acid from which it is prepared and from which its properties differ primarily in its ability to form aqueous salt solutions free of aluminum and iron precipitates and preferably free of all precipitates. Because its composition is not at equilibrium, this acid is unstable and prolonged storage before neutralization will permit hydrolysis of the polyphosphoric acid to the ortho form with consequential loss of its ability to form aqueous salt solutions. The salt solutions formed from this acid before appreciable hydrolysis, however, are stable since the hydrolysis rate of polyphosphates to orthophosphates is negligible at neutral pH values.

Although clear aqueous salt solutions can be obtained with the aforedescribed non-equilibrated phosphoric acid, I have found that additional, highly beneficial properties can be imparted to the acid if the entire bulk thereof is concentrated sufficiently to prepare an acid having an equilibrated composition. The term "anhydrous liquid phosphoric acid" will be used hereinafter to refer to this acid, for, although it can contain some free water, it is anhydrous in the sense that it has been concentrated past its maximum content of orthophosphoric acid. Further concentration of the acid results in an increase in the amount of polyphosphoric acid. Because this acid can be obtained as a substantially non-corrosive liquid having a high acid concentration, the expense inherent in the shipment and handling of a larger bulk of more dilute wet process acid in corrosion resistant equipment is greatly reduced.

I have found that the substantially anhydrous liquid phosphoric acid prepared in accordance with my invention not only can be neutralized to form aqueous salt solutions free of precipitates but can be used in lieu of the dilute wet process phosphoric acid in conventional "solid fertilizer" manufacture, to obtain a hard, dense, non-hygroscopic solid. Solid fertilizers are manufactured in a varied range of nitrogen and phosphorus contents, mixed with other fertilizer ingredients, when desired, such as superphosphate, triple superphosphate, urea, ammonium nitrate, ammonium sulfate, potassium chloride, etc. Typically, the "solid fertilizer" is a mixed ammonium phosphate, ammonium sulfate, and superphosphate corresponding to a "16–20–0" designation. The aforementioned improved physical properties obtained by use of the acid of the invention are in contrast to those of the solid fertilizer commonly produced from the dilute wet process acid which is hygroscopic, powdery and friable.

I have also found that the substantially anhydrous liquid phosphoric acid obtained by the invention when neutralized with anhydrous ammonia in a manner hereinafter described will produce a non-hygroscopic solid which is easily crushed into hard dense granules which are very slowly dissolvable in cold water. The nitrogen content of this solid is about 15–20 weight percent; the phosphorus expressed as $P_2O_5$ about 40–60 weight percent. Because of these properties, this material is an excellent solid fertilizer having a slow release of plant nutrients and is much easier to handle than solid fertilizers previously prepared from wet process phosphoric acid. Because the solid is non-hygroscopic, it can be safely stored without caking. The exact chemical nature of this solid is not known; however, the limited solubility rate of this compound indicates that it is not simply mono- or di-ammonium phosphate, nor a mixture thereof.

Wet process phosphoric acid can be treated to obtain the requisite amount of acyclic polyphosphoric acid in a variety of ways. Because of desired acyclic polyphosphoric acid species is intermediate in concentration between the ortho form present in wet process acid and the highly dehydrated meta species, it can conveniently be formed by concentrating all or a portion of the wet process acid. The acid can be heated to expel the volatile impurities, silica and fluorine, and thereafter anhydrous phosphorus pentoxide can be added to concentrate the acid sufficiently to form the acyclic polyphosphoric acid. Preferably, however, the acid is heated under atmospheric or subatmospheric pressure to molecularly dehydrate a sufficient portion thereof and form the acyclic polyphosphoric acid in situ. When concentrated by heating, the entire bulk of wet process acid can be heated uniformly to produce the substantially anhydrous liquid acid having the requisite amount of acyclic polyphosphoric acid in an equilibrium state with the remainder of the acid comprising chiefly orthophosphoric acid and some water. The non-equilibrated acid can also be obtained by heating the entire bulk of the wet process acid under conditions such that the acyclic polyphosphoric acid species is formed in only the acid adjacent the heating elements. If desired, the bulk of the wet process acid can be divided, a portion thereof concentrated sufficiently and blended with the unheated portion to produce the non-equilibrated acid.

The acids produced by my invention will now be described in detail, setting forth the limits to their acyclic polyacid content and its effect on the physical and chemical nature of the acids.

Considering first the process of the invention in its generic sense; applicable to production of the non-equilibrated acid and the substantially anhydrous phosphoric acid; the acid which is subjected to treatment is the previously described wet process acid containing the various normally incidental metallic impurities such as iron, aluminum, magnesium, chromium, vanadium, zinc, copper, etc., in the form of sulfates, fluorides, phosphates, etc. These metallic impurities normally precipitate as insoluble orthophosphate salts when the acid is neutralized with a suitable base, e.g., ammonium or an alkali metal hydroxide. A complete description of such acid and the processes by which it is made are set forth in "Phosphoric Acid, Phosphates and Phosphate Fertilizers" by W. H. Waggaman, 2nd edition, pages 174–208 (Rheinhold Publishing Corp., 1952). Such acid is available commercially in both dilute and "concentrated" forms, containing about 25–35 and about 35–55 weight percent of $P_2O_5$, respectively, and either concentration may be employed. However, in most instances, it is more economical to start with the acid in the aforementioned "concentrated" form.

The heat treatment of the invention consists in subjecting the wet process phosphoric acid to a temperature above about 100° C. at superatmospheric, atmospheric or reduced pressures so as to remove the volatile impurities, e.g., silica and fluorine, therefrom. The heating can be batchwise or continuous. During the heating there is a copious evolution of white vapors comprising silica, fluorine, and some water vapor from the acid. After these vapors cease to be evolved, generally within 1 to 15 minutes, the heating can be discontinued and further concentration of the acid achieved by addition of anhydrous phosphorus pentoxide or a more highly concentrated acid. Preferably, however, heating of the acid is continued to expel additional amounts of water and form the necessary amount of polyphosphoric acid. Because heating the acid substantially purifies the acid of fluorine, it is thereby rendered suitable for use as a phosphate source in animal and poultry feed.

When production of liquid neutral salt solutions is the object of the invention, the minimum amount of acyclic polyphosphoric acid is that amount which prevents gelatinous precipitates, principally aluminum and iron orthophosphate, from forming in a sufficient quantity to render the acid non-flowable. This quantity is about two atomic weights of phosphorus as polyphosphoric acid per atomic weight of aluminum and iron. Although at this minimum concentration of polyphosphoric acid, insoluble precipitates are formed with the remaining metal impurities, these precipitates are granular and can be readily separated by settling or filtration. Preferably, the amount of acyclic polyphosphoric acid formed is in excess of the aforedescribed minimum, sufficient to prevent the formation of all precipitates.

As previously mentioned, the polyphosphoric acid can be formed in the wet process phosphoric acid by heating and the acid product can be a non-equilibrated acid having an average concentration and properties similar to the untreated wet process acid, with the exception that it can be neutralized to form flowable and preferably clear salt solutions. Preferably, however, the wet process acid is heated and concentrated to provide the substantially anhydrous liquid phosphoric acid which can be marketed as such or used to produce the aforementioned aqueous and solid fertilizers by neutralization with ammonia.

I have found that unless the acyclic polyphosphoric acid is present in the anhydrous liquid phosphoric acid in a sufficient quantity; in excess of that required to avoid precipitation of the iron and aluminum; the metal impurities incident in the acid can precipitate as orthophosphates salts and cause the bulk of the anhydrous liquid phosphoric acid to solidify. This occurrence is very unexpected, since metal orthophosphates are well known to have a high solubility in acids. When this precipitation occurs, the only way to dissolve the precipitate is to dilute the acid by addition of large amounts of water or to heat the acid to about 150° to 200° C. Heating to such temperatures is ususally prohibitive and dilution renders the acid corrosive and destroys all the beneficial properties of the concentrated acid. The problem is intensified by the danger of mistaking precipitation of the metal orthophosphates for freezing of the acid. The natural tendency when the acid begins to solidify is to conclude that it is below its freezing point and to heat it. Heating the acid, however, will only reduce its viscosity and, if the solidification is due to precipitation of the metal orthophosphates, will increase the rate of precipitation until the entire bulk of the acid becomes a hard solid. For these reasons, it is important that the concentration of the acid be greater than the minimum necessary to prevent the metal impurities from precipitating. This concentration is also sufficient to prevent the formation of precipitates in neutral salt solutions commonly prepared from the acid, e.g., "8–24–0". The necessary minimum content of acyclic polyacid is determined by the following:

$$P_2O_5\ \text{poly} = \frac{C}{2}\left[M - \frac{K}{(2P_2O_5\ \text{ortho})^n}\right]$$

wherein C is determined by the following:

$$C = \frac{2Fe + 2Al + 12Mg + 4Zn + 3Cu + 2V}{Fe + Al + Mg + Zn + Cu + V}.$$

a = average valance of impurities and is determined by the following:

$$a = \frac{3Fe + Al + 2Mg + 2Zn + 2Cu + 5V}{Fe + Al + Mg + Zn + Cu + V}.$$

The atomic symbols represent the gram atomic weights of their respective metals per 100 grams of the acid, M = total gram atomic weight of metals per 100 grams of acid, $P_2O_5$ ortho = total gram molecular weights of phosphorus present as orthophosphoric acid per 100 grams of acid, calculated as $P_2O_5$, $P_2O_5$ poly = total gram molecular weights of phosphorus present as acyclic polyphosphoric acid per 100 grams of acid, calculated as $P_2O_5$, and K is between 0 and about $0.5 \times 10^{-2}$.

My invention will now be described by reference to the drawings of which:

Figure 4:
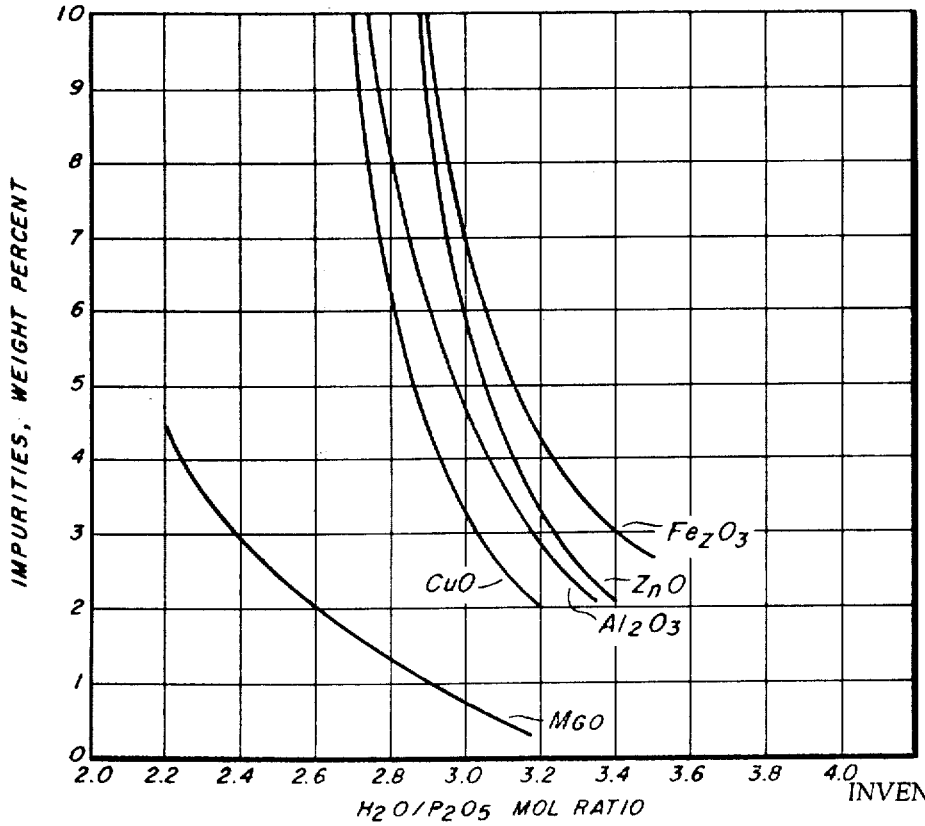
Figure 5:
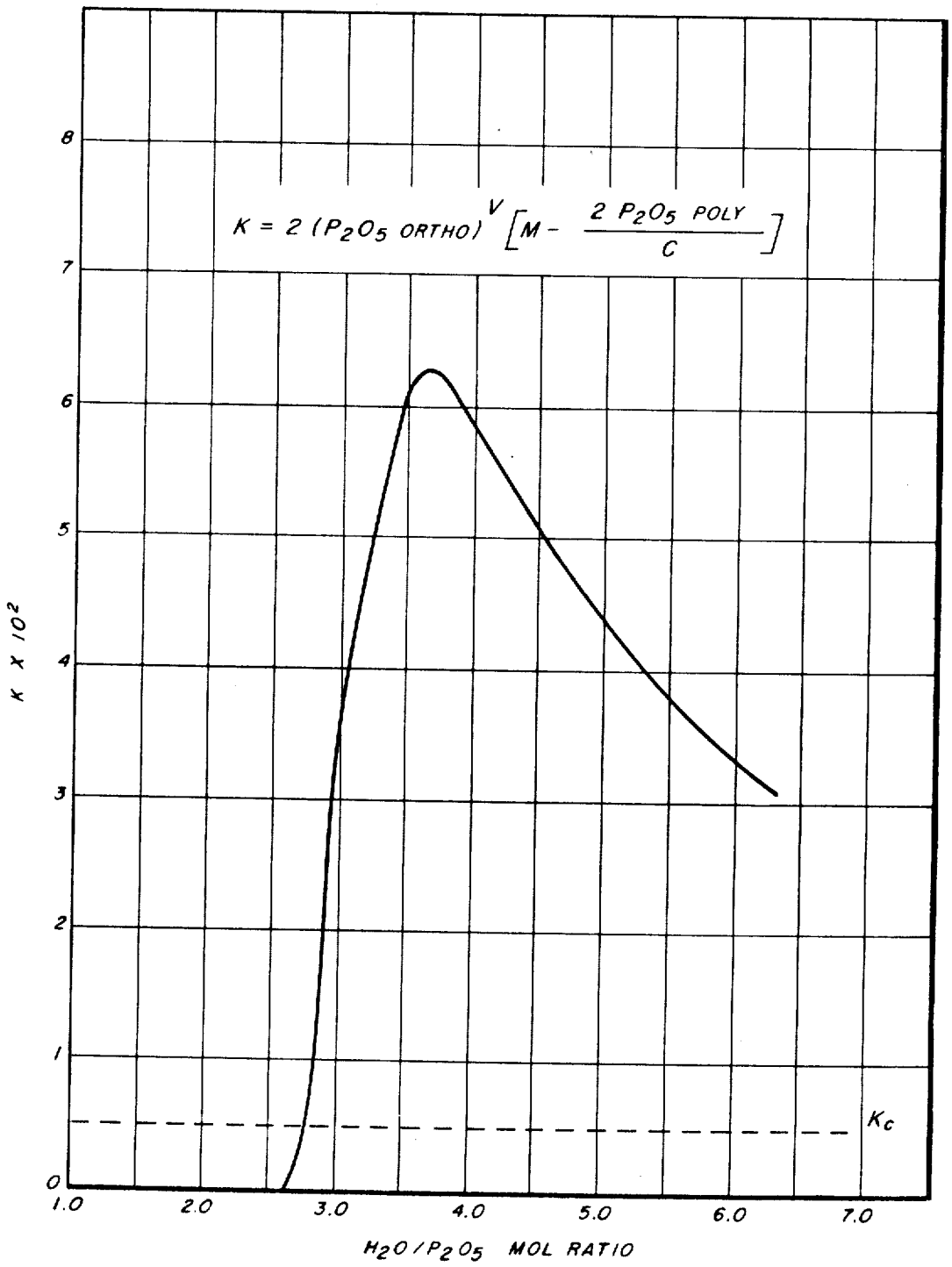
Figure 6:
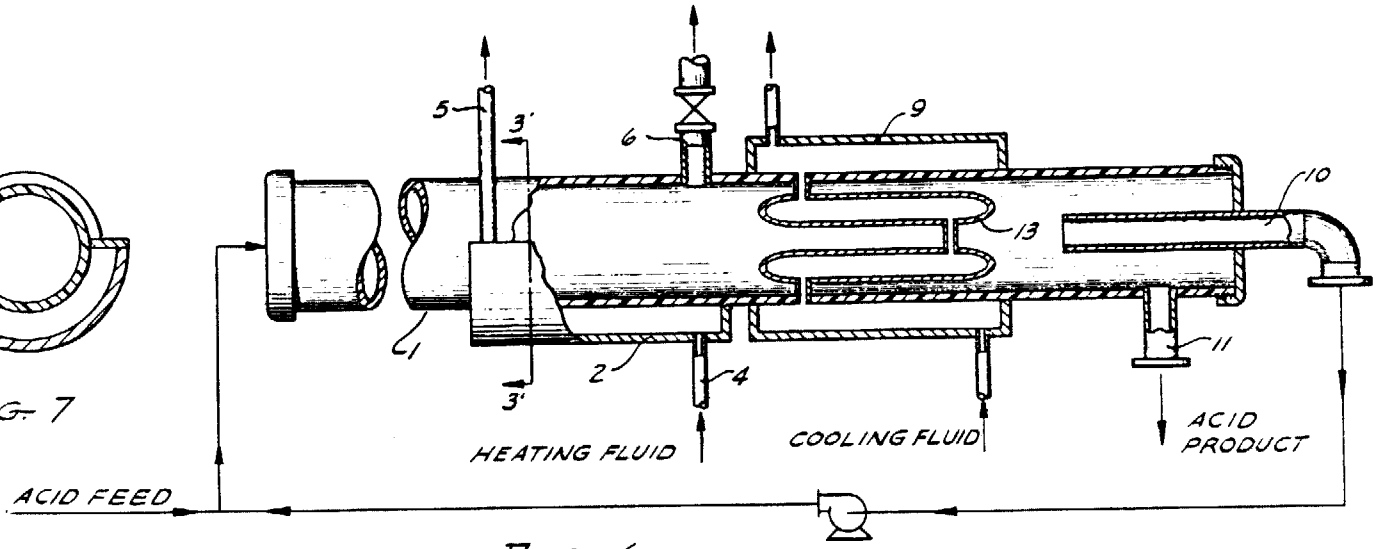
Figure 7:
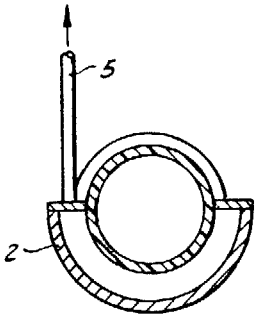
Figure 8:
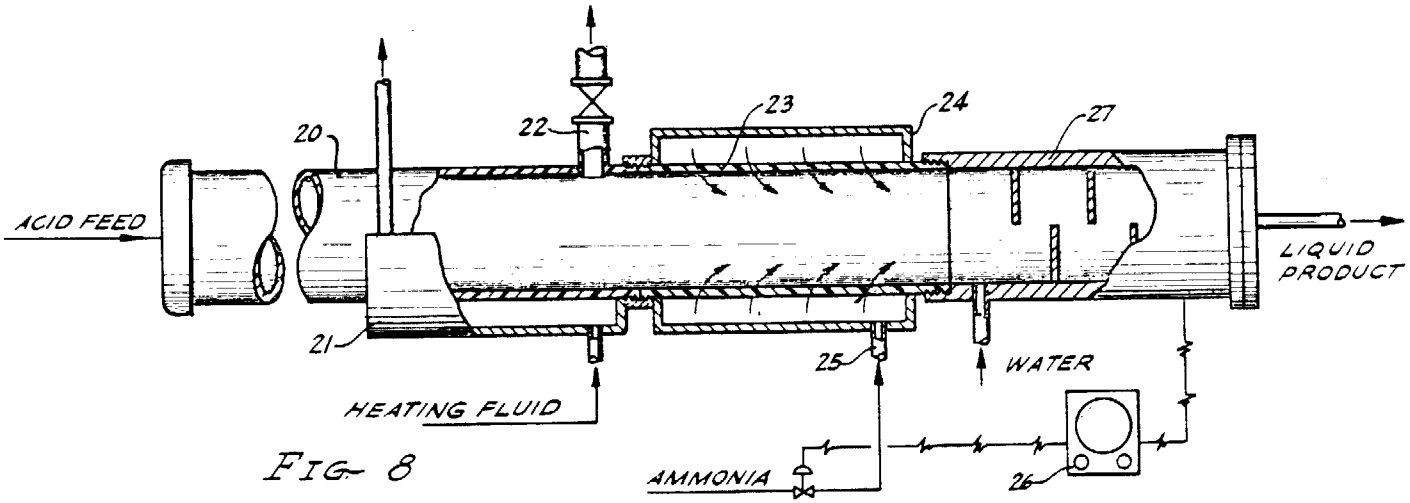

FIG. 4 presents a family of curves showing the necessary acid concentration to prevent precipitates from forming in the acid and/or salt solutions prepared therefrom for each of several non-volatile metal impurities incident in wet process acid;

FIG. 5 shows the value of K, a solubility constant described hereinafter, as a function of a wet process acid's concentration;

FIG. 6 and 7 illustrate a system for treating phosphoric acid in accordance with my invention; and FIG. 8 illustrates a system for preparing an aqueous salt solution from wet process phosphoric acid in accordance with my invention.

Figure 1:
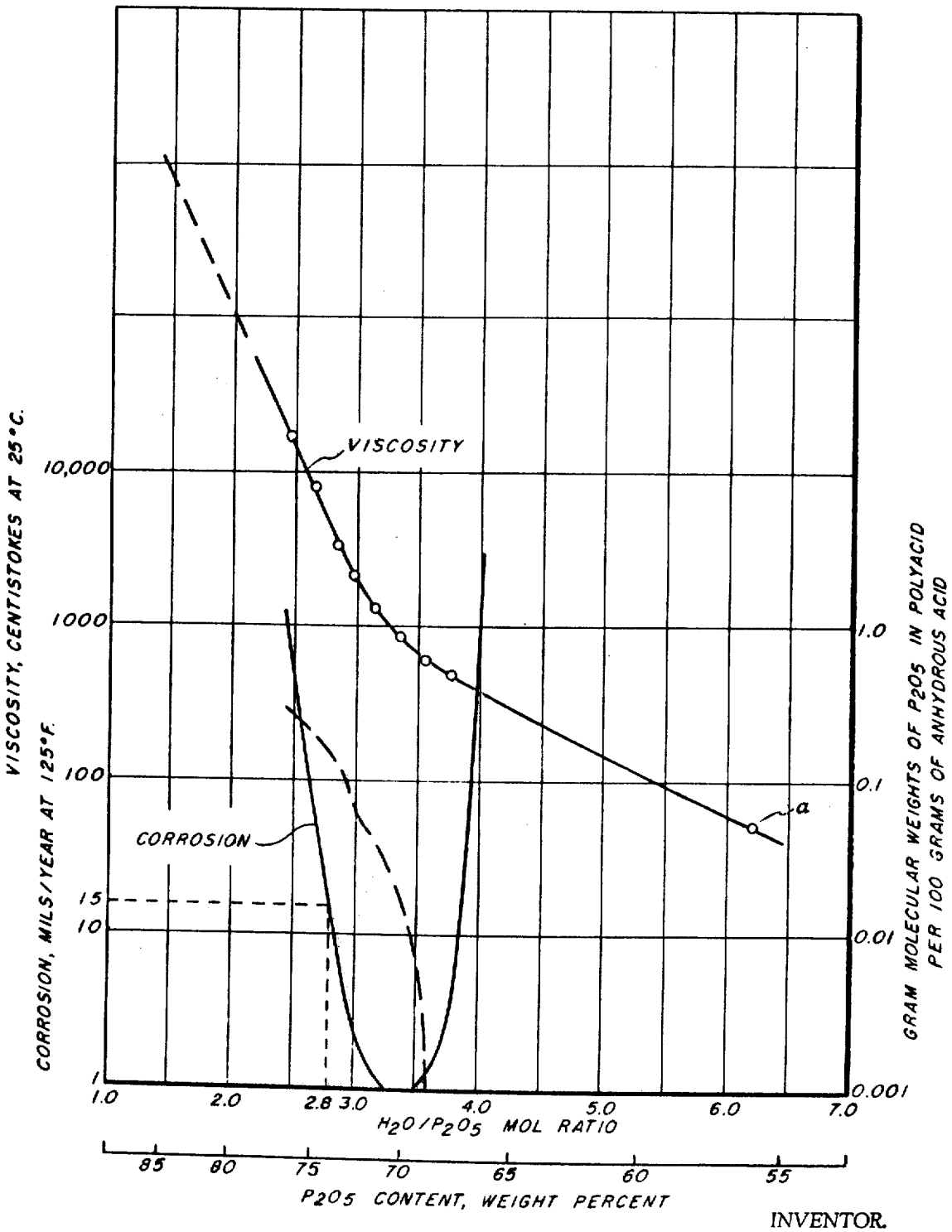
FIG. 1 illustrates the polyacid content, corrosion rate, and viscosity of an equilibrated phosphoric acid derived from wet process acid as a function of its average concentration, expresses as a mol ratio of water to phosphorus, calculated as $P_2O_5$.

Referring now to FIG. 1, the changes encountered in the production of a substantially anhydrous phosphoric acid from the wet process acid will be described. Point 1, on the viscosity curve, represents an untreated wet process phosphoric acid containing 6.5 weight percent impurities and about 53.5 weight percent phosphorus as phosphorus pentoxide. The mol ratio of water to pentoxide of this acid is 6.2. As the acid is heated, silica, fluorine and water are expelled and the acid viscosity gradually increases as shown. Upon reaching a mol ratio of water to pentoxide of about 4.0, the corrosivity of the acid rapidly decreases until the acid is substantially non-corrosive at a mol ratio of water to pentoxide between about 3.3 to about 3.6. At a mol ratio of water to pentoxide of 3.6, the acyclic form of phosphoric acid begins to form and the acid composition in gram molecular weights of $P_2O_5$ in the polyphosphoric acid per 100 grams of total acid is shown by the broken line curve. The formation of the polyacid is accompanied by rapid increase in the acid's viscosity and followed by an increase in corrosivity of the acid. The increase in viscosity is due in part to the formation of the acyclic polyphosphoric acid and in part to the metal impurities present. Of the metal impurities, I have found that the presence of aluminum causes the greatest increase in viscosity.

As previously mentioned, the maximum concentration of my anhydrous phosphoric acid is about 2.0 mole of water per mol of pentoxide, since at greater concentrations metaphosphoric acid is formed which precipitates the impurities as insoluble metaphosphate salts. Preferably, however, the anhydrous phosphoric acid has a corrosion rate at 125° F. no greater than about 15 mils per year. From FIG. 1 it can be seen that to maintain this corrosion rate, the acid should not be concentrated to a mol ratio of water to pentoxide of about 2.8 or less. It is noted that the polyacid begins to form in the equilibrated acid at a mol ratio of water to $P_2O_5$ of 3.6, i.e., in an acid containing about 95 weight percent orthophosphoric acid and still containing about 5 weight percent uncombined water. Although this composition has some free water, the acid is herein referred to as a substantially anhydrous acid since it is anhydrous in the sense that it has reached its maximum concentration of orthophosphoric acid and further concentration increases the polyacid content.

Figure 2:
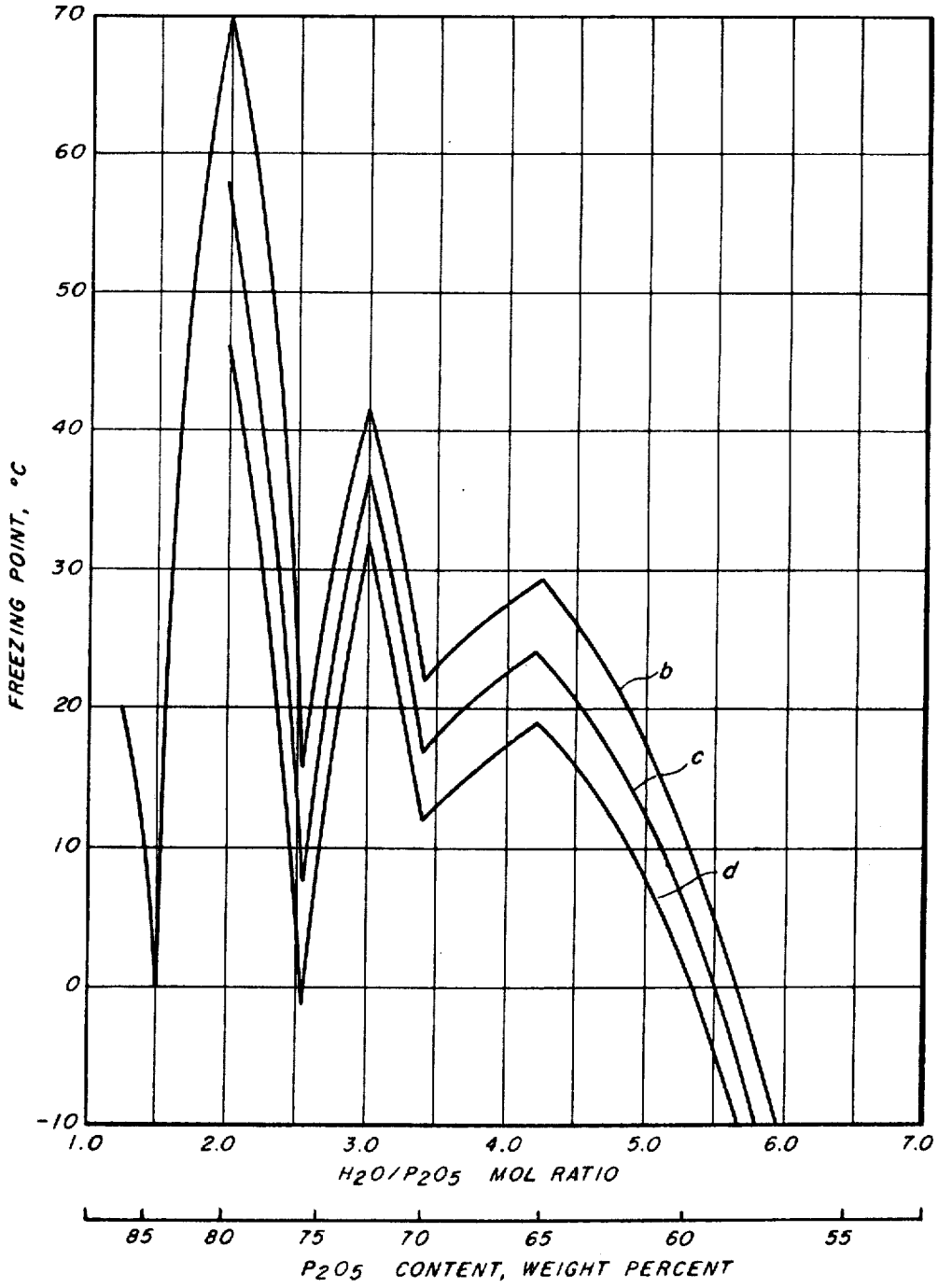
FIG. 2 illustrates the freezing point of phosphoric acid with a family of curves at 0, 4 and 8 weight percent impurities.

Referring now to FIG. 2, the freezing point of the acid is shown as a function of its concentration. Wet process acid as commonly marketed has a freezing point below −10° Centigrade. As the acid is concentrated, the freezing point increases to about 29° C. at a mol ratio of water to $P_2O_5$ of about 4.24, then decreases to about 22° C. at about a mol ratio of water to $P_2O_5$ of about 3.4, again increases to about 42° C. at a mol ratio of water to $P_2O_5$ of about 3.0, then decreases to about 16° C. at about 2.55 mols of water per mol pentoxide. Further concentration increases the acid's freezing point to about 70° C. at a mol ratio of water to pentoxide of about 2.0. The depressant effect that impurities have on the freezing point is also shown, by lines c and d which depict the freezing point of acids having respectively 4 and 8 weight percent of impurities typically found in wet process phosphoric acids. It is noted that the acid throughout a substantial portion of the polyphosphoric acid range, i.e., of a mol ratio of water to $P_2O_5$ less than about 3.6 has a freezing point above most ambient temperatures. Despite its high freezing point, the acid is usually a liquid at room temperatures because it can be subcooled without crystallization. If the acid does crystallize it can be converted to the liquid merely by heating to above its freezing point. In instances where it is not convenient to heat the acid, the freezing point can be reduced to a temperature beneath the minimum expected by adding a freezing point depressant. In this connection, it is important to prevent the formation of insoluble precipitates with the metal impurities in the acid which, by mere observation, are indistinguishable from the freezing of the acid. Addition of freezing point depressants to the acid fail to prevent this solidification and attempting to thaw the solid by heating accelerates the solidification until a hard mass is obtained. Accordingly, the polyacid content of the substantially anhydrous acid of my invention should be sufficient to avoid this solidification as determined by the foregoing equation.

Figure 3:
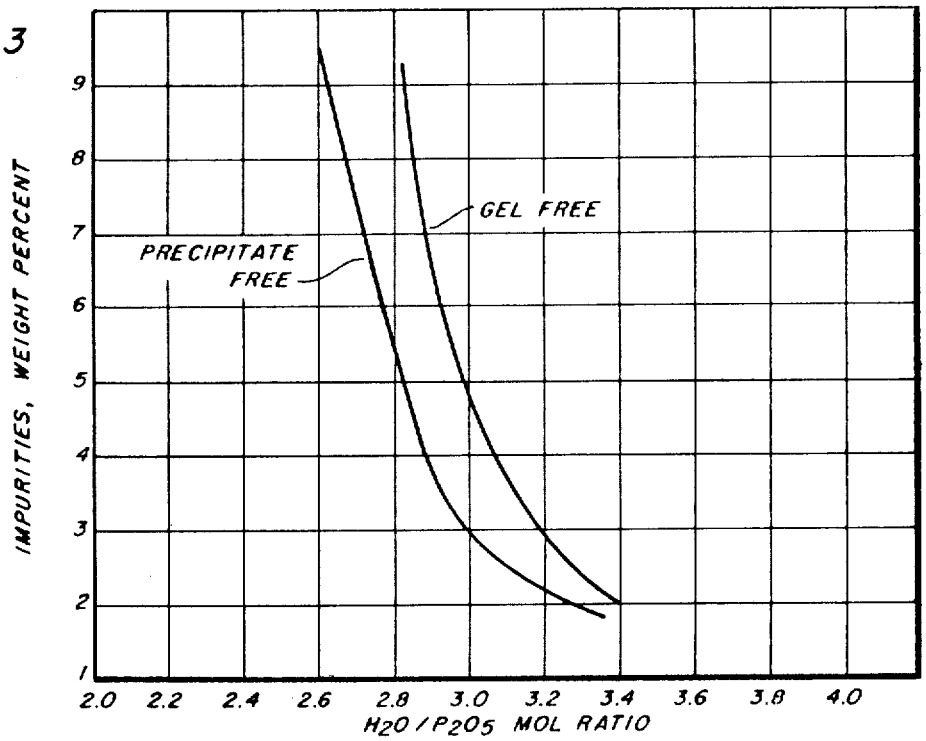
FIG. 3 illustrates the effect of metal impurities incident in wet process acid on the necessary concentration of phosphoric acid to avoid gelation of salt solutions obtained therefrom and to avoid precipitation of the metal impurities in the acid and/or in the salt solutions prepared therefrom.

Referring now to FIG. 3, the necessary concentration of a wet process acid to prevent gelation of neutral salt solutions prepared therefrom is shown as a function of the weight percent content of the non-volatile metallic impurities in the acid. Also shown is the necessary concentration to prevent precipitates from forming in the substantially anhydrous acid as well as neutral salt solutions prepared therefrom. The slope and position of these curves is dependent upon the distribution of the impurities, the curves of FIG. 3 having been prepared for a wet process acid having the following distribution of impurities expressed as oxides.

| | Weight Percent |
|---|---|
| Iron | 19.3 |
| Aluminum | 66.0 |
| Magnesium | 2.0 |
| Zinc | 4.4 |
| Chromium | 3.6 |
| Vanadium | 4.7 |

FIG. 4 illustrates the necessary acid concentration to avoid precipitation of metal orthophosphates for a series of metals commonly found as impurities in wet process acid. From this family of curves it can be seen that magnesium requires a far higher concentration of acid to prevent precipitation than the same amount of other metal impurities. On a molal basis, an atomic weight of magnesium requires six times as many atomic weights of phosphorus as polyphosphoric acid than an atomic weight of iron or aluminum. The selective removal of one atomic weight of magnesium would, therefore, reduce the necessary content of acyclic polyphosphoric acid sixfold the reduction obtained by the removal of one atomic weight of iron or aluminum. The selected removal of magnesium can be accomplished in any suitable manner, for instance by ion exchange or by electrodeposition of the magnesium. To impart selectivity of the latter method for magnesium, a suitable membrane which is permeable only to magnesium ions can be placed about the cathode cell.

I have discovered that magnesium can be selectively removed from the dilute wet process acid by passing the acid over a cation exchange resin at suitable conditions, e.g., atmospheric pressure and ambient temperature. This discovery is contrary to the generally held belief that trivalent ions are more strongly adsorbed by ion exchange resins than are bi- or uni-valent ions, e.g., see "Ion Exchange" by Walton (1949), pp. 13 to 16. Thus it would be expected that ion exchange of the wet process acid would remove the aluminum and iron impurities in preference to the magnesium. I have found, however, that passage of the acid over a conventional cation exchange resin removes magnesium in preference to aluminum and iron. The removal of magnesium in this manner is of particular advantage when the acid has a sufficiently high impurity content that it must be concentrated to a corrosive range to avoid precipitation of the impurities, i.e., to a mol ratio of $H_2O/P_2O_5$ less than about 2.8. Removal of some of the impurities, notably magnesium, will reduce the degree of concentration to a ratio greater than about 2.8 and permit the production of an anhydrous acid still containing a majority of the metal impurities yet which is non-corrosive.

For removing magnesium ions, I may use any of the well known materials which are water insoluble and are capable of exchanging a hydrogen ion for a metallic ion. In particular, I may use the carbonaceous hydrogen zeolites such as those described in the Transactions of the American Society of Mechanical Engineers for May 1938, pages 315–325, or any of the various phenolicaldehyde resins or phenol sulfonic acid-aldehyde resins. These materials are capable of exchanging a hydrogen ion for a metallic ion even though the percolating solution is already fairly concentrated with acid. I have found that solutions having a pH as low as 1.0 are still capable of exchanging metallic ions for hydrogen ions.

In the utilization of these ionic exchange materials such as the carbonaceous hydrogen zeolites, I at present regard it as a preferred practice to pass the liquor through a bed of the material. However, it is not essential that this be done. The important thing is to bring the liquor and the treating material into intimate contact. This may be done, for example, by mixing the material with the liquor and then removing it therefrom, as by means of screening, reeling centrifuging, filtering, or the like. Naturally, in any such process due regard must be had of the frangibility of the ionic exchange material.

Whenever in the use of these materials, tests show that substantial quantities of the cations which it is desired to remove are, in fact, coming through in the treated liquor, the treating step with that material should be discontinued. The material may be regenerated and its ability to exchange hydrogen ions for other cations renewed by thoroughly washing it with a strong acid, as, for example, an aqueous solution of a mineral acid. The material will then be carefully rinsed in order to avoid introduction of the regenerating acid into a subsequent acid sorption step.

In addition to magnesium, some aluminum is also removed by the ion exchange step. Since aluminum has the most pronounced effect on viscosity of the acid, its removal results in a substantial reduction in the viscosity of the anhydrous phosphoric acid. Accordingly, it is within the scope of my invention to selectively remove the magnesium and/or aluminum impurities from the wet process phosphoric acid prior to its concentration. Preferably, this removal is achieved by cation exchange with a suitable cation exchange resin, e.g., Amberlite IR-120.

FIGS. 3 and 4 have been presented only to illustrate the effect of impurity identity and content. While the relationship shown in FIG. 3 in general is similar for wet process acids having different distribution of metal impurities, the necessary concentration varies with the identity of the impurities and therefore should be determined from the aforementioned equation.

By rearrangement of the terms of the aforementioned equation the following can be obtained:

$$K = (2P_2O_5\ \text{ortho})^a \left[ M - \frac{2P_2O_5\ \text{poly}}{C} \right]$$

where the terms have the same definition as previously mentioned. In any single acid, a, C and M are constant and accordingly the K value of the acid depends on the concentration of the poly and orthophosphoric acid. FIG. 5 illustrates the change in K encountered upon concentration of a typical wet process acid. The horizontal line $K_c$ at $0.5 \times 10^{-2}$ represents the value of K which I have determined is necessary to prevent precipitation in the acid.

A typical wet process acid having about 53 weight percent phosphorus calculated as the pentoxide and about 4.6 weight percent impurities is represented at the extreme right terminus of the curve. This acid has a K value of $3.1 \times 10^{-2}$, indicating that precipitation should occur. This precipitation actually occurs in the storage vessels and tank cars employed to store and ship the acid. A common practice necessitated by this precipitation is for the manufacturer to bill the purchaser only for the amount of liquid acid removed from the tank car, the precipitated impurities being returned. As the acid is concentrated, its K value increases until a maximum of $6.4 \times 10^{-2}$ is reached at a concentration of 3.6 mols of water per mol of pentoxide. The extent of precipitation which can occur at this concentration is so great as to cause the entire bulk of the acid to solidify. Continued concentration of the acid will result in a lowering of the K value resulting from formation of the acyclic polyphosphoric acid until at a mol ratio of water to pentoxide of 2.75, the K value reaches about $0.5 \times 10^{-2}$ and the metal impurities are stabilized in the acid. This curve illustrates the difficulty which can occur if the acid is insufficiently concentrated. If, for example, the acid had been concentrated to about 2.8 mols of water to pentoxide, precipitation could occur. As prevously mentioned, heating will only lower the viscosity of the acid and accelerate the rate of precipitation. Dilution of the acid will, initially, also increase the extent of precipitation until the maximum value of K is passed. Thereafter dilution will reduce precipitation. At this point, however, the acid composition no longer contains any acyclic polyphosphoric acid and all of its beneficial properties will be lost.

Analytical Techniques

The following analytical techniques are employed to evaluate the acids of my invention:

The total $P_2O_5$ content of the acids is determined by diluting a representative sample with water, adding perchloric and nitric acids and boiling the mixture to convert all forms of phosphoric acid to orthophosphoric acid. The sample is then passed over a cation exchange resin to replace the metal cations with hydrogen as these cations will interfere with the subsequent analysis. The ion exchanged sample is thereafter titrated with a strong base through two break points, the first of which corresponds to neutralization of the strong acids present, hydrochloric, nitric, etc., and the most strongly ionized hydrogen of the orthophosphoric acid. The second break point in the titration curve at a pH of about 9.5 to 10 corresponds to neutralization of the second, less strongly ionized hydrogen of orthophosphoric acid. The difference in titer between these break points corresponds to the total phosphate present which is reported as total $P_2O_5$.

The water content of the acid, existing as water of constitution and water of dilution, is determined by placing a weighted portion of the acid in a crucible with zinc oxide in excess of that needed to react with the acid. The crucible is then weighted, dried at 100° C. for one hour and placed in an oven at 550° C. for an hour. The loss in weight corresponds to the total water present in the acid.

To determine the amount of orthophosphoric acid present, various analytical techniques can be employed. Regardless of the analytical method employed, prior thereto, the acid sample is prepared by diluting it with water, then acidifying it with concentrated sulfuric or nitric acid, followed by further dilution. Care should be taken to avoid elevated temperatures and the sample preparation should be done in an ice bath to avoid hydrolysis of the polyphosphoric acid forms. The resultant solution is then passed over a strong-acid, cation-exchange resin, e.g., Amberlite IR-120H to remove the metallic cation impurities which interfere with the subsequent analysis. Immediately after passage over the resin, the acid should be neutralized to a pH of about 3.5 to about 6 to reduce the hydrolysis tendency of the polyphosphoric acid. The acid is thereafter titrated to the break point, falling between about 9.5 and 10 and corresponding to neutralization of the second, weakly ionized hydrogen of orthophosphoric acid. Thereafter an excess of a silver nitrate solution is added to precipitate silver orthophosphate and release the third, very weakly ionized hydrogen ion of orthophosphoric acid. The resultant solution is then titrated to determine the amount of hydrogen ion released in the silver precipitation and this titer value corresponds to the amount of orthophosphoric acid present in the sample which is reported on a $P_2O_5$ basis.

The amount of phosphorus pentoxide existing in the form of polyphosphoric acid can be determined by the difference between the total $P_2O_5$ present and that existing as orthophosphoric acid. When, however, the polyphosphoric acid is present in low concentrations, constituting 5 percent or less of the total $P_2O_5$ content, it is preferred to analyze for the polyphoshoric acid directly, by an anion exchange chromatography method such as described by Peters and Rieman in Analytica Chimica Octa, 14, page 131, and by Weiner in Journal American Oil Chemists' Society, 34, page 124. Prior to the analysis, however, the previously described sample preparation should be carefully followed.

The total amount of impurities present in the acid as weight percent can be determined by a difference method, i.e., by subtracting the sum of the weight percent water and total phosphorus pentoxide from 100. Because the value of M in the aforedescribed equation is for only the metallic impurities, impurities determined by the difference method must be corrected for the sulfate content of the acid. The amount can be readily determined by a standard sulfur analysis by the induction furnace method. The metallic impurities can also be determined by either conventional wet analytical techniques or by quantitative emission spectroscopy.

The Heating Step.

The heating step by which wet process phosphoric acid is concentrated to prepare either the anhydrous or non-equilibrated acid can be batchwise or continuous and can be conducted at superatmospheric, atmospheric, or reduced pressures. Indirect heating means such as heating coils, externally heated vessels, submerged combustion, or even electrical heating can be employed. The temperature to which the acid must be heated can be between about 120° and about 400° C., depending upon the pressure and nature of heating.

The anhydrous liquid acid is obtained by heating wet process acid under conditions to assure relatively uniform heating of the entire acid body. The wet process acid can be heated through the walls of its containing vessel or by heat transfer means immersed within the liquid. During heating, the body of liquid is preferably stirred or agitated to mix the acid thoroughly and prevent localized overheating and concentration which readily occurs in the viscous acid. The acid can also be heated by forming a film of acid on a heated surface, e.g., by flowing it downwardly over an inclined or vertical heated plate. Submerged combustion heating under very severe turbulence can also be employed, e.g., by directing opposed jets of hot gases and cold acid together and/or passing the hot gases and entrained liquid through a tortuous path or through a very narrow flow area. The hot combustion gases also serve as a stripping medium and reduce the temperature of heating to attain the desired concentration. Another technique is to heat the acid in an arc furnace by immersing carbon electrodes into the acid and connecting them to an alternating current supply. If desired, the containing vessel or a portion thereof can be used as an electrode surface. Use of alternating current avoids polarization of the electrodes which can occur with direct current. When the voltage is raised to above about 80 volts, an arc discharge between the electrodes and acid forms about the electrodes and prevents contact between the acid and the electrodes. By this method, corrosion of the electrodes by the acid is eliminated and, if desired, metallic electrodes can be employed.

The non-equilibrated acid can be prepared by subjecting only a portion of the crude wet process acid to sufficient heating to concentrate it and form the necessary amount of acyclic polyphosphoric acid. This can be accomplished by separating a portion of the acid, concentrating the separated portion by heating and then reblending. Because the acid is relatively viscous and resistant to mixing, another method of preparing the non-equilibrated acid is to heat the entire body of acid while passing it successively through a heating and cooling zone. In the heating zone, the bulk of the acid is heated insufficiently to form polyphosphoric acid, i.e., to a temperature less than about 200° C. at atmospheric pressure, while the portion of the acid adjacent the heating surface is heated above about 200° C. so as to drive sufficient water therefrom and form the acyclic polyphosphoric acid. This acid then passes to the cooling zone where it is rapidly cooled. When the acid is thus cooled, the acyclic polyphosphoric acid contained therein has a hydrolysis rate slower than its rate of formation at the greater temperature of the heating zone. As a result, an accumulation of polyphosphoric acid in the bulk of the acid being treated is achieved and this accumulation can be increased by cycling the acid successively through heating and cooling zones.

These conditions of heating can suitably be achieved by use of the apparatus shown in FIGS. 6 and 7. This apparatus consists of central tube 1, constructed of corrosion resistant material, e.g., impervious graphite, having its lower outside periphery surrounded by heating jacket 2. Inlet and outlet connections 4 and 5 are provided in the jacket to permit circulation of a heating fluid, e.g., hot combustion gases. A volatile withdrawal conduit 6 is positioned in the upper unheated periphery of tube 1. Immediately downstream of heating jacket 2 is cooling jacket 9. If desired, the central tube in this region can be constructed of the same material as in the heating zone, e.g., impervious graphite, or other material such as stainless steel. Preferably, thermal insulation is provided between these zones in tube 1. Downstream of the cooling section there is positioned a central recycle off-take conduit 10 which removes liquid acid from the center of the flowing stream. Acid product is removed via tube 11.

In operation, wet process acid is passed through the heating zone so that the upper liquid level is at or slightly above the upper level of heating jacket 2, but beneath the volatile outlet 6. Preferably the liquid level is also sufficiently high to submerge the inlet of conduit 10. Hot flue or combustion gases at temperature between 500° and 3,500° F. are passed into the heating zone and heat graphite tube 1. The film of acid flowing over the inside surface of tube 1 is rapidly heated and loses some of its heat to the main body of acid which is heated to about 120° to 185° C. During this heating the volatile impurities, e.g., silica and fluorine are driven off from the acid along with some of the acid's water content. Because the acid is relatively viscous even at its boiling point, e.g., from 0.1 to 1.0 centistokes, the film of acid adjacent the heated periphery of tube 1 is not rapidly mixed with the main body of acid and is heated to temperatures between about 200° to 375° C., sufficient to remove some of the water of constitution and form the aforementioned acyclic polyphosphoric acid. Despite its greater temperature, the film is maintained because the polyphoshoric acid which comprises a major portion of the film is viscous. The heated acid flows into a cooling zone surrounded by cooling jacket 9 and containing cooling coil 13 where it is rapidly quenched to a temperature below about 200° C., and preferably below about 65° C. Because the acid is rapidly cooled before the polyphosphoric acid completely reverts to the ortho form, there is obtained a build-up of polyphosphoric acid in the heat-treated acid. This is augmented by recycling a portion of the acid from conduit 10 back to tha acid inlet.

It is, of course, obvious that other systems can be employed without departing from the scope of the invention, e.g., the recycling step can be replaced by connecting a series of alternate heating and cooling zones. Rather than operating a continuous system, the invention lends itself to a batch process by heating a batch of the acid in a vessel and removing the volatilized impurities and water vapor. During the period when these volatiles are removed or immediately thereafter, a cooling fluid is circulated through coils immersed beneath the liquid level and preferably in the upper portion of the liquid acid bath. The cycling of the acid between the heating and cooling zones is obtained by the convection currents which are established in the liquid. When sufficient polyphosphoric acid is formed, constituting between about 1 and 40 percent of the acid's $P_2O_5$ content, the heating is stopped and the cooling continued until the acid is cooled to a relatively stable temperature, e.g., about 225° C. or lower. If desired, electrical resistance heating can also be employed to heat a portion of acid and produce the non-equilibrated product. In this embodiment, an electric resistance heater, e.g., a graphite rod, or similar corrosion resistant heater is immersed in the acid and current is passed through the resistor to heat it and the surrounding acid. This technique can be employed in the devices shown in FIGS. 6 and 8, for instance, by merely positioning a resistance heater beneath the liquid level in heating end of central tube 1 or 20 in lieu of the illustrated heating jackets 2 and 21.

If desired, the ammonium phosphate can be prepared from this acid during or immediately after the heating, e.g., by passing anhydrous ammonia directly into the body of acid being heated. In this embodiment, the exothermic heat of reaction also supplies a portion of the heat to concentrate the acid. Preferably the ammonia is introduced directly into the acid adjacent the heating surfaces. Sufficient water is also added to the acid to obtain the desired product, e.g., an "8–24–0" ammonium phosphate. An apparatus for performing this on a continuous basis is shown in FIG. 8. This apparatus consists of a central tube 20, heating jacket 21 and volatile withdrawal conduit 22 all similar to that previously described in reference to FIGS. 6 and 7. In place of the cooling zone, however, there is substituted a neutralization zone consisting of a gas permeable tube 23 surrounded by jacket 24 which has an ammonia inlet line 25. Ammonia is introduced into the acid stream and contacts the acid film having the necessary polyphosphoric acid content and thereby stabilizes this acid against hydrolysis to the ortho form. The ammonia continues to mix with and neutralize the remainder of the acid stream and the degree of this neutralization is controlled by any suitable means, e.g., pH meter 26. Positioned within tube 1, downstream from the neutralization zone, is a mixing zone comprising a plurality of baffles 27 to insure complete mixing of the ammonium phosphate liquid. A water inlet 28 is also provided to obtain the desired fertilizer strength, e.g., 8–24–0.

When the non-equilibrated acid is obtained by mixing treated and untreated acids, the wet process acid which is heat-treated is either a portion of the main body of acid or any other available wet process acid. The heat treatment is suitably any of the aforementioned treatments, however, it is conducted under severe conditions, i.e., high temperatures and/or low pressures so as to form a high content of acyclic polyphosphoric acid. As previously mentioned, the acid cannot be concentrated to a mol ratio of water to $P_2O_5$ of 2.0 or less or metaphosphoric acid will be formed and metallic metaphosphates will precipitate in the heated acid. This maximum content of condensed phosphoric acid is sufficient to permit up to 7.5:1 dilutions of untreated wet process acid to the heated acid and still produce a gel-free aqueous ammonium phosphate product upon neutralization.

Upon completion of the heating operation, the non-volatile product thereof is preferably cooled to a temperature of about 125° C. or lower, prior to being admixed with the unheated wet process acid. When the final mixed acid product, i.e., the combination of heat-treated and non-heat-treated acids, is to be reacted more or less immediately with ammonia to form amonium phosphate, the heat-treated acid is usually cooled only to about 75° C. – 125° C. prior to being admixed with the untreated acid. On the other hand when the combined acids are to be stored for several hours or longer, it is necessary to cool the heat-treated acid to atmospheric temperature, i.e., 15° C. – 40° C., prior to admixing it with the unheated acid to retain its desired properties.

The proportions in which the heat-treated and unheated acids are combined depends primarily upon the extent of the concentration achieved in the heat treatment. Thus, when the temperature of heating under atmospheric pressure is, say, 300° C. and about 62 percent of its $P_2O_5$ content is thereby converted to acyclic polyphosphoric acid, a smaller proportion of the heat-treated acid is employed than when the temperature of heating is, say, 250° C. and only about 36 percent of its $P_2O_5$ content is converted to the acyclic polyphosphoric form. As previously mentioned, to obtain a gel-free liquid salt solution, it is necessary to provide about one molecular weight of $P_2O_5$ in the polyphosphoric acid form for each gram atomic weight of aluminum and iron present. Preferably, the mixed acid product is prepred entirely from crude wet process acid of 50–55 weight percent $P_2O_5$ concentration and the temperature of heating is about 275° C. – 325° C., sufficient to convert about 65 percent of its $P_2O_5$ content to acyclic polyphosphoric acid. Between about 30 and about 50 percent of the acid is subjected to the heat treatment and is thereafter admixed with the remaining 70–50 percent of the original acid. The resulting mixed product will contain from about 62.5 to about 67.5 weight percent of $P_2O_5$ on an impurity free basis, of which from 40 to 60 percent is derived from the heat-treated acid and the remainder is derived from the untreated acid. The total gram molecular weights of $P_2O_5$ as polyphosphoric acid will be between about 0.107 and 0.179 per 100 grams of mixed acid. This is sufficient to satisfy the aforementioned equation for most wet process phosphoric acids and thereby maintain all the non-volatile impurities in solution upon neutralization.

The Neutralization Step

The substantially anhydrous and the non-equilibrated acids obtained in the aforedescribed manners can be neutralized with ammonia to form an aqueous ammonium phosphate liquid in various ways. If desired, the acid heating and neutralization steps can be conducted at the same site by passing the heated acid directly to a neutralization zone, and this is the preferred technique with the non-equilibrated acid. With the substantially anhydrous acid, however, the heating or concentration step can be performed at the site of the wet process acid manufacture and the product shipped as a concentrated, preferably non-corrosive, acid to the site of neutralization.

As previously described in connection with FIG. 8, one convenient method of neutralizing the non-equilibrated acid is to introduce the ammonia into the body of acid immediately after it passes over the heating surfaces. In another mode of operation, the acid product (either the anhydrous or non-equilibrated) is diluted with water to a $P_2O_5$ content of about 20–30 and neutralized immediately. In some instances, the non-equilibrated acid may have a $P_2O_5$ content of about 20–30 percent, in which case the dilution step is not necessary. Thereafter, the acid is passed to a suitable reaction vessel wherein it is reacted at a temperature between about 30° C. and about 100° C. with sufficient anhydrous ammonia to produce an aqueous ammonium phosphate product having a pH value between about 5.5 and about 10, preferably between about 6.5 and about 8.5. Such amount of ammonia will correspond to between about 0.03 and about 0.7 part by weight of ammonia per part by weight of $P_2O_5$ present in the acid. When preparing an essentially neutral product (pH = 7), about 0.4 part by weight of ammonia is employed per part by weight of $P_2O_5$ present in the acid, and the aqueous product obtained will contain about 46–48 weight percent of ammonium phosphates (mono- and di-hydrogen) and will analyze about 8 percent by weight of nitrogen and about 24 percent by weight of phosphorus calculated as $P_2O_5$, corresponding to the fertilizer designation "8–24–0".

According to an alternative mode of operation, the acid product (either the anhydrous or non-equilibrated) is diluted to a $P_2O_5$ concentration of about 35–55 percent by weight, and the ammonia is employed in the form of a 20–30 percent aqueous solution. When employing commercial aqua ammonia of about 23–28 percent concentration, it is preferred that the acid reactant contain about 36–40 weight percent $P_2O_5$ and that the reaction be carried out about 80° C.–95° C. employing about one part per volume of the aqueous ammonia per part by volume of the mixed acid product. Such mode of operation produces an "8–2–4–0" composition having a pH value of about 7.

In contrast to the aqueous ammonium phosphate compositions prepared from ordinary wet process phosphoric acid, the aqueous compositions prepared from the herein described acid product of the invention take the form of substantially clear green solutions having viscosities which are of the order of 5–5 centipoises and which do not increase appreciably upon standing for extended periods of time.

In contrast to the aqueous ammonium phosphate solutions prepared from pure or relatively pure furnace grade phosphoric acids, the solutions prepared from the treated wet process acid of my invention have much lower crystallization temperatures. Liquid ammonium phosphate solutions prepared from pure phosphoric acid are generally limited to concentrations no greater than about "8–24–0", i.e., with about 8 weight percent nitrogen and 24 weight percent phosphorus as $P_2O_5$ to maintain the crystallization temperature below about 0° C. Concentrations above about "8–24–0" have crystallization temperatures above 0° C., e.g., an "11–3–3–0" crystallizes at about 50° C. I have found that polyphosphates in my aqueous ammonium phosphate solutions depress the freezing point thereof, e.g., an "11–33–0" concentration has been prepared which remains liquid at temperatures as low as −14° C.

To prepare the aforementioned green glass solid suitable for use as a fertilizer, the undiluted substantially anhydrous liquid phosphoric acid product is reacted with anhydrous ammonia. The resultant solid ammonium phosphate product can be marketed as such or dissolved in water to form an aqueous composition. The reaction should be carried out at an elevated temperature, e.g., at about 150° C. – 200° C. to maintain the reaction mixture in the liquid state. When operating batchwise, the mixed acid product is charged to a suitable vessel and heated to a temperature of about 100° C. – 225° C. Anhydrous ammonia is then gradually introduced into the body of heated acid in such amount that an aqueous solution of the reaction product has a pH value between about 5.5 and about 10.0, preferably between about 6.5 and about 8.5. In order to maintain the reaction temperature high enough to avoid solidification of the product, it may or may not be necessary to add heat to the reaction vessel. The reaction itself is exothermic, and by suitably designing and insulating the reaction vessel it is possible to maintain the desired reaction temperature utilizing the exothermic heat of reaction as the sole source of heat. Otherwise, the reaction vessel is provided with means for supplying heat thereto from an outside source. The immediate product of the reaction is a hot liquid material containing the majority of the metallic impurities originally present in the crude wet process acid. If allowed to cool to atmospheric temperature, such material solidifies to a substantially non-hygroscopic solid which can be granulated by conventional means to form a substantially free-flowing solid ammonium phosphate fertilizer suitable for direct application to the soil by spreading, drilling, dusting, etc. Such solid product, however, is but slowly dissolved in cold water. Accordingly, if it is desired to form an aqueous solution of such solid material, the requisite amount of water is best added directly to the hot molten reaction product rather than allowing the latter to solidify by cooling and then attempting to dissolve the solidified product in the water. The amount of water so added should be at least sufficient to form an aqueous solution in which no crystallization occurs at the temperatures encountered during storage, shipment and use, but may of course be considerably greater. Commercially, it is customary to employ sufficient water to prepare an aqueous product containing about 45–50 percent by weight of the solid. The aqueous solution prepared by the method just described is similar to the aqueous products prepared by the other methods herein described, i.e., they take the form of clear green mobile liquids which do not form precipitates or gels, or increase substantially in viscosity, upon storage for long periods of time.

As previously mentioned, use of the substantially anhydrous acid in lieu of wet process acid produces solid ammonium phosphate fertilizers which are easier to store, handle and apply to the soil because of their surprising and unexpected physical properties. Thus, solid ammonium phosphate fertilizers can be produced in accordance with the invention by mixing the anhydrous phosphoric acid produced with various other fertilizer ingredients such as sulfuric acid, ammonium nitrate, ammonium phosphate, urea, superphosphate, triple superphosphate, potassium chloride, etc., and the mixtures ammoniated in a reactor. The amount of ammonia which is added depends on the amount and nature of the acidic ingredients but generally is sufficient to convert the phosphates into the diammonium form; about 4 moles of ammonia are added per mole of $P_2O_5$ in the phosphoric acid and between about 2 to 4 moles of ammonia are added per mole of water soluble $P_2O_5$ produced from the superphosphate. When sulfuric acid is also added, sufficient ammonia is added to form diammonium sulfate. The ammoniation can be conducted in conventional equipment, e.g., rotary batch mixer, pug mill, screw conveyor, etc., at temperatures between about 150° to 225° F. The reaction product is a partially fused solid at this temperature and is transferred to a cooling and drying zone, e.g., a rotating horizontal drum, where it is contacted with cool dehumidified air, cooled and crushed into solid granules. These granules can then be screened, the desired size range separated, the coarser size range crushed and the fines recycled to the reactor. The use of the anhydrous liquid phosphoric acid produced in accordance with the invention, rather than crude wet process acid, results in a threefold decrease in the fines production and thus greatly reduces the fines recycle rate. The product obtained is a non-hygroscopic, hard, dense material. As a result of its increased hardness, the solid can be spread over a 50 percent wider swath than possible with the product from wet process acid when using a conventional rotary broadcaster. Caking of the stored solid, a problem encountered with the hygroscopic solid produced from wet process acid, is completely eliminated by the non-hygroscopic nature of the solid product produced from the concentrated anhydrous acid. These beneficial physical properties are completely unexpected and unpredictable since the nitrogen and phosphorus contents of the final product is comparable to that commonly produced from 25–52 percent $P_2O_5$ wet process acid, and the process of neutralization is substantially the same as employed with wet process acid except that the aforementioned concentrated anhydrous acid is used as a feed material.

The following examples will illustrate various ways in which the principle of the invention may be applied, but are not to be construed as limiting the invention.

Example 1

A typical wet process phosphoric acid having a concentration expressed as $P_2O_5$ of about 53 weight percent, a total impurity content of about 6.5 weight percent and a non-volatile metals content of about 4.1 weight percent calculated as the oxide was slowly heated with a heating mantle until its atmosphere boiling point temperature was about 260° C. During the heating, the acid was continuously stirred to avoid localized overheating while white fumes, chiefly comprising silica, fluorine and water vapor are removed. The acid was cooled, sampled and found to have a $P_2O_5$ content of 71 weight percent and a water content of 21 percent. The non-volatile impurities content (by difference) was 8 percent of which about 2.6 weight percent comprises sulfate calculated as sulfur trioxide. The metal impurities (calculated as oxides) had the following distribution:

| | Weight Percent |
|---|---|
| Aluminum | 66.0 |
| Iron | 19.3 |
| Magnesium | 2.0 |
| Zinc | 4.4 |
| Chromium | 3.6 |
| Vanadium | 4.7 |

Calculations based on the preceding equation indicate that this acid could be diluted to a concentration expressed as a mol ratio of water to pentoxide of about 2.82, corresponding to a $P_2O_5$ concentration of 68 weight percent as analyzed or 72.8 weight percent on an impurity free basis, without danger of precipitation of the metal impurities in the acid or in aqueous salt solutions prepared therefrom. Aliquot portions of the acid were diluted with sufficient water to obtain a series of eight acid samples with decreasing $P_2O_5$ contents at one percent increments from 70 to 63 weight percent $P_2O_5$ contents. These acid samples were held at 65° C. for 24 hours to insure equilibrium. Viscosities at 25° C. were determined and appear in FIG. 1. The acids were neutralized to a pH of 6.5 with 28 percent strength aqueous ammonia at 30° C. to obtain ammonium phosphate solutions of an "8–24–0" strength. The total $P_2O_5$ content and orthophosphate content were analyzed in the aqueous ammonium phosphate solution so obtained and their polyphosphate content determined by the difference between the total and ortho $P_2O_5$. The corresponding polyphosphoric acid content of the acids appear in FIG. 1 and a comparison of the predicted behavior of the acids upon neutralization appears in Table 1. From the Table 1, it can be seen that in instances when the actual polyphosphoric acid content exceeded or equaled the calculation minimum content, no precipitates were formed in the "8–24–0" solution.

The gram atomic weights of aluminum and iron in the 8–24–0 solution prepared from the acids was 0.028 per 100 grams of solution. Solutions prepared from acids 4, 5 and 6 had polyphosphate contents, respectively, of 0.055, 0.033 and 0.016. Thus it can be seen from samples 4 and 5 that providing at least two atomic weights of phosphorus as polyphosphoric acid (or one atomic weight of $P_2O_5$) per each atomic weight of iron and aluminum in the acid prevents gelation of the 8–24–0 solution prepared therefrom. Failure to provide this amount of polyphosphoric acid (sample 6) resulted in gelation of the neutralized solution.

Table 1

| Sample | $P_2O_5$ Wt. % | $H_2O$ Wt. % | Mol Ratio $H_2O/P_2O_5$ | Actual[a] Polyphosphoric Acid | Calculated Minimum[a] Polyphosphoric Acid Precipitate Free[b] | Nature of "8-24-O" Predicted | Nature of "8-24-O" Actual |
|---|---|---|---|---|---|---|---|
| 1 | 70 | 22.1 | 2.49 | 0.26 | 0.05 | Clear | Clear |
| 2 | 69 | 23.2 | 2.65 | 0.18 | 0.08 | Clear | Clear |
| 3 | 68 | 24.3 | 2.82 | 0.13 | 0.09 | Clear | Clear |
| 4 | 67 | 25.5 | 3.00 | 0.052 | 0.09 | Precipitate | 1 – 2 % precipitated |
| 5 | 66 | 26.6 | 3.16 | 0.030 | 0.09 | Precipitate | 1 – 2 % precipitated |
| 6 | 65 | 27.7 | 3.36 | 0.016 | 0.09 | Gel | Gelled |
| 7 | 64 | 28.8 | 3.54 | 0 | 0.09 | Gel | Gelled |
| 8 | 63 | 29.8 | 3.74 | 0 | 0.09 | Gel | Gelled |

[a]Expressed as gram molecular weights of $P_2O_5$ per 100 grams of acid.

[b]Calculated per $P_2O_5$ poly $= M - \frac{C}{2}\left[\frac{0.5 \times 10^{-2}}{(2P_2O_5 \text{ ortho})^2}\right]$

Example 2

A wet process phosphoric acid having a concentration of about 53 weight percent $P_2O_5$ and about 4.6 weight percent non-volatile metal impurities was heated and concentrated by a submerged combustion burner. Analysis of the heated acid gave the following results.

| | Weight Percent |
|---|---|
| $P_2O_5$ | 68.3 |
| $H_2O$ | 22.3 |
| Total impurities (difference) | 9.4 |
| Sulfate impurities | 3.4 |
| Non-volatile metals | 6.0 |

the non-volatile metal impurities had the following distribution expressed as oxides:

| | Weight Percent |
|---|---|
| Aluminum | 62.3 |
| Iron | 22.5 |
| Magnesium | 2.1 |
| Zinc | 4.3 |
| Chromium | 3.7 |
| Vanadium | 5.2 |

Samples of the acid were then diluted with water to obtain acids having concentrations (calculated as $P_2O_5$) at one percent increments from 68.3 to 62 weight percent. Portions of these acid samples were placed in an oven at 150° F. to accelerate the rate of precipitation of any metal orthophosphate which might be insoluble. The temperature of 150° F. was above the maximum freezing point of the acid in this concentration range (112° F.) and thus avoided any possibility of the acid freezing. To each of the remaining portions of the acid samples about 1.5 weight percent anhydrous ammonia was added, sufficient to depress the freezing point of the anhydrous liquid phosphoric acid about 10° C. These acid samples were also placed in the oven at 150° F. From calculations based on the polyphosphoric acid content of the samples, their behavior was predicted and a comparison of predicted and actual behavior is shown in Table 2. From the comparison, it can be seen that the minimum polyphosphoric acid content of the acid must be equal to or greater than that determined by the equation, or precipitation of the metal impurities will occur in the substantially anhydrous liquid acid. This precipitation is quite unexpected as metals are normally soluble in phosphoric acid. The precipitation was so severe in acid samples 4 to 7 that the entire bulk of the acid appeared solid. The addition of 1.5 weight percent ammonia of samples of the acid failed to prevent the precipitation.

Table 2

| Sample | $P_2O_5$ Wt. % | $H_2O$ Wt. % | Mol Ratio $H_2O/P_2O_5$ | Actual[a] Polyphosphoric Acid | Calculated Minimum[a,b] Polyphosphoric Acid | Nature of Acid Predicted | Nature of Acid Actual |
|---|---|---|---|---|---|---|---|
| 1 | 68.3 | 22.3 | 2.58 | 0.220 | 0.062 | Clear | Clear |
| 2 | 67 | 23.7 | 2.79 | 0.170 | 0.074 | Clear | Clear |
| 3 | 66 | 24.9 | 2.98 | 0.054 | 0.089 | Precipitate | Precipitated |
| 4 | 65 | 26.0 | 3.16 | 0.036 | 0.089 | Precipitate | Extensive Precipitation |
| 5 | 64 | 27.2 | 3.35 | 0.018 | 0.086 | Precipitate | Extensive Precipitation |
| 6 | 63 | 28.3 | 3.54 | 0 | 0.086 | Precipitate | Extensive Precipitation |
| 7 | 62 | 29.6 | 3.76 | 0 | 0.084 | Precipitate | Extensive Precipitation |

[a]Expressed as gram molecular weights of $P_2O_5$ per 100 grams of acid.

[b]Calculated per $P_2O_5$ poly $= M - \frac{C}{2}\left[\frac{0.5 \times 10^{-2}}{(2P_2O_5 \text{ ortho})^a}\right]$ Example 3

A sample of the same wet process acid of about 53 percent $P_2O_5$acid as used in Example 2 was slowly heated with stirring at atmospheric pressure until precipitates were noticed in the acid. The temperature at this point was 385° C. A portion of the acid was cooled, diluted with water and neutralized with ammonia to form an "8-24-0" ammonium phosphate. The precipitate noted in the heated acid remained in the ammonium phosphate product and constituted about 20 volume percent of the ammonium phosphate after centrifuging. This precipitate comprised metallic metaphosphates. Upon cooling, the remainder of the heated acid solidified into a hard green hygroscopic solid. The mol ratio of water to $P_2O_5$ of the concentrated acid was 1.65. Because the acid was extremely viscous and dark green in color it was difficult to determine when the precipitates first formed. The precipitates were metaphosphate salts of the metal impurities. Because metaphosphoric acid begins to form at a concentration of about 2.0 mols of water per mol of pentoxide, it is preferred not to exceed this concentration.

Example 4

To exemplify the method of heating the acid nonuniformly as described in regard to FIGS. 6 and 8, approximately 111 parts by weight of wet process phosphoric acid containing about 53 weight percent of $P_2O_5$ were charged to a reaction vessel and therein heated with a burner to a temperature of about 135° C. The reaction vessel was a three-necked 500 ml. flask. A thermometer was placed in one end of the flask to determined the temperature of the main body of acid and the lower end of a separatory funnel was placed slightly above the liquid level through the neck at the opposite end of the vessel. A stirrer, comprising a single flat paddle on the end of a motor-driven shaft was lowered through the central neck and positioned within the lower portion of the vessel as to clear the sides of the flask by about 3/16 to ¼ inch. The stirrer was rotated at about 120 to 300 revolutions per minute. A laboratory gas burner was positioned to direct a flame against the side of the vessel, below the liquid level at the end of the flask receiving the funnel. During the heating there was an evolution of white vapors from the acid which began to boil at about 118° C. The heating was continued until the acid temperature reached 135° C.; a period of about 10 minutes. When the thermometer read 135° C., the flame was shut off and about 106 parts by weight of 28 percent by weight aqueous ammonia were passed from the separatory funnel into the body of the heat-treated acid over a period of about 3 minutes. The resulting product was then admixed with 135 parts by weight of water to obtain the ammonium phosphate product as a clear green liquid having a viscosity of about 8.6 cps., a pH value of about 7.1, and containing about 8 percent by weight of nitrogen and about 24 percent by weight of phosphorus calculated as $P_2O_5$. This sample was analyzed and found to contain about 20 percent of its $P_2O_5$ content in the form of molecularly dehydrated phosphate. When the acid was not heated, but neutralized by slowly adding the ammonia over about a 3 to 5 minute period, the product was a cloudy liquid containing large amounts of precipitates and having a tendency to gel. When the acid was heated slowly over about a 40 minute period to 135° C. with an electric heating mantle which surrounded the entire lower portion of the flask, a similar cloudy liquid containing precipitates was formed upon neutralization. An analysis of this sample showed that, within analytical error, all the phosphate present was in the ortho form.

Example 5

About 1000 parts by weight of wet process phosphoric acid containing about 53 weight percent of $P_2O_5$ content were charged to a vessel and therein slowly heated with an electric heating mantle and with rapid stirring to a temperature of about 195° C. During the heating there was a copious evolution of white vapors from the acid, which evolution substantially ceased within about 5 minutes after the temperature reached 195° C. The water vapor volatilized from the acid was condensed and measured 181 milliliters. While still maintaining the temperature in excess of 160° C., anhydrous ammonia was slowly added in an amount sufficient to neutralize the acid. A sample was withdrawn from the reaction mixture and allowed to cool to room temperature, whereupon it solidified to a substantially non-hygroscopic mass which was difficultly soluble in cold water. The main body of the reaction mixture was allowed to cool to about 150° C. and was then diluted with about 1100 parts of cold water. After dilution the pH of the product was adjusted to about 8.1 by addition of a slight amount of aqua ammonia. The aqueous ammonium phosphate so obtained was a clear green liquid having a viscosity of about 8 centipoise and analyzing about 8 percent by weight of nitrogen and 20 percent by weight of phosphorus calculated as $P_2O_5$. By suitable adjustment of pH and dilution, a variety of final solutions having a nitrogen content between 3 and 15 weight percent and a phosphorus content as $P_2O_5$ between 10 and 45 weight percent can similarly be obtained.

Example 6

About 500 parts by weight of wet process phosphoric acid containing about 53 weight percent of $P_2O_5$ content were charged to a vessel and therein slowly heated with rapid stirring to a temperature of about 185° C. During the heating, white vapors were evolved from the acid. The water vapor in the volatilized portion was condensed and comprised 75 parts. While maintaining said heating, 120 parts by anhydrous ammonia were slowly added, the rate of ammonia addition being controlled to maintain a relatively constant temperature. During the ammoniation, the temperature rose to about 197° C. and 60 additional parts of water were removed. The reaction mass ammoniation was sampled and about 582 parts of water were added to the main body of the product. The pH of the diluted product was adjusted to about 8 with 28 percent strength aqueous ammonia. The liquid ammonium phosphate product so obtained was a clear green liquid and contained about 8 percent by weight of nitrogen and about 20 percent by weight of phosphorus calculated as $P_2O_5$. The sample withdrawn prior to dilution was cooled to room temperature and was a hard dense green solid having about 13 percent by weight of nitrogen and 55 percent by weight of phosphorus calculated as $P_2O_5$.

Example 7

About 500 parts by weight of wet process phosphoric acid containing about 53 weight percent of $P_2O_5$ was charged to a reaction vessel and therein slowly heated to about 185° C. After about a 95 part weight loss, the treated acid which was a clear green liquid free of precipitation, was cooled and stored for 24 hours. The acid was then diluted with about 300 parts of water and immediately reacted at a temperature between about 20° to 40° C. with about 425 parts of 28 percent strength aqueous ammonia. The resulting solution was a clear dark green liquid having a pH of about 7. After about 48 hours, a slight amount of a white micro-crystalline precipitate was observed. This precipitate was removed by filtration and comprised about 0.14 percent by weight of the solution. A sample of the filtered solution and a sample of the precipitate were analyzed by qualitative emission spectroscopy. The solution was found to have phosphorus in major amounts, aluminum and iron in moderate amounts and magnesium, chromium, zinc, silica, calcium and boron in slight amounts. The crystalline precipitate was found to have major amounts of phosphorus, slight amounts of magnesium and trace amounts of iron, chromium, silica and manganese. No aluminum was found in the precipitate.

Example 8

A mixed non-equilibrated acid is prepared by dividing a wet process phosphoric acid containing about 53 weight percent $P_2O_5$ into two equal parts, hereinafter referred to as portions A and B, respectively. Portion A is placed in a reaction vessel equipped with a stirrer and vapor outlet, and is therein heated to a temperature of 300° C. over a period of about 40 minutes. During the heating, the viscosity of the acid increases substantially and there is a copious evolution of white vapors from the vapor outlet. The heated portion is then cooled to about 100° C. and is admixed with Portion B to obtain a mixed acid product containing about 64 weight percent of $P_2O_5$. Based on the loss in weight upon heating and a typical phosphoric acid analysis, the amount of polyphosphoric acid present in Portion A is about 83 percent of the total $P_2O_5$ content, and in the mixed non-equilibrated acid is about 34 percent of the total $P_2O_5$ content. Approximately 500 parts of this non-equilibrated acid are heated to 60° C. and 833 parts of dilute aqueous ammonia of 15 weight percent concentration are added gradually with stirring. The aqueous ammonium phosphate product so obtained is a clear green liquid which does not deposit solids or increase in viscosity upon standing.

Example 9

A solid mixed fertilizer corresponding to a typical "16–20–0" designation is produced by ammoniation of a substantially anhydrous liquid phosphoric acid and triple superphosphate in the presence of recycle fines and ammonium sulfate. The reactants are charged to a rotary reaction zone in proper proportion to produce a product having the following contents:

| | Parts by Weight |
|---|---|
| Equilibrated phosphoric acid | 324 |
| Triple superphosphate | 403 |

-continued

| | Parts by Weight |
|---|---|
| Ammonium sulfate | 1133 |
| Ammonia | 100 |
| Water | 40 |

The substantially anhydrous liquid phosphoric acid is obtained by heating a wet process phosphoric acid (52 percent $P_2O_5$) to a temperature between about 225° to 235° C. while removing the volatilized impurities and sufficient water to concentrate the acid to a mol ratio of $H_2O/P_2O_5$ of about 3.14. The temperature in the ammoniation reactor is between about 150° to 250° F., and the reaction product is transferred to a horizontal rotating drum where it is contacted with cooled, dehumidified air to cool and dry the solid. This product is superior to that produced directly from wet process acid having about 52 percent $P_2O_5$ in that the product produced from the anhydrous acid of the invention has very few fines, does not dust or break with handling and does not cake in storage. It is also superior in spreadibility when applied to the soil.

Other fertilizer compositions which can be prepared from the equilibrated acid which show the same superiority over those prepared from wet process phosphoric acid include the following:

Table 3

| Composition | Parts By Weight 1 | 2 | 3 |
|---|---|---|---|
| Substantially anhydrous liquid phosphoric acid | 590 | 590 | 1333 |
| Urea | — | — | 258 |
| Ammonia | 150 | 250 | 250 |
| Ammonium sulfate | 940 | 550 | — |
| Sulfuric acid | — | 290 | — |
| Triple superphosphate | — | — | 119 |
| Gypsum | 280 | 280 | — |
| Water | 40 | 40 | 40 |

Compositions 1 and 2 are referred to as "16–20–0" fertilizers, having 16 weight percent nitrogen and 20 weight percent phosphorus expressed as $P_2O_5$. Composition 3 is an example of a 16–48–0 having 16 weight percent nitrogen and 48 weight percent phosphorus expressed as $P_2O_5$.

Example 10

The selectivity of ion exchange resins for removal of the various metal ions contained in wet process phosphoric acid as incidental impurities was determined by passing a sample of wet process phosphoric acid having about 53 weight percent $P_2O_5$ over a hydrogen charged ion exchange resin. The resin employed was one marketed by the Rohm and Haas Company under the designation "Amberlite IR-120"; a strongly acidic polystyrene nuclear sulfonic acid resin having a high capacity for cation exchange. One hundred twenty grams of the resin (wet form) were packed between two glass wool plugs in a glass column and the wet process acid was permitted to flow by gravity through the column. After 50 grams of acid had passed through the resin, the effluent was sampled and analyzed by quantitative emission spectroscopy. A sample taken from the effluent after 100 grams had passed through the column was similarly analyzed. The analytical results so obtained were corrected for the dilution which occurred from the wet resin and are summarized in Table 4. From these results it can be seen that a substantial percentage of the magnesium and zinc impurities were removed throughout the experiment. Some of the iron and chromium were initially removed, but after passage of 100 grams of the acid over the resin, no decrease in the acid's content of these impurities was observed. The acid's content of chromium was not altered by the ion exchange resin. The aluminum was substantially reduced initially, but at 100 grams of acid, the capacity of the resin to exchange hydrogen ions for aluminum was exceeded. Calculations using the aforedescribed equation indicate that to produce an anhydrous phosphoric acid from which the metal impurities will not precipitate will require an acyclic polyphosphoric acid content of 0.113 gram molecular weights of $P_2O_5$ per 100 grams. This acid can be seen to have a corrosion rate of about 15 mils per year at 125° F. from FIG. 1. Similar calculations based on the acid effluent sample taken after 50 grams of acid had passed over the resin indicate that 0.070 gram molecular weight of $P_2O_5$ per 100 grams of acid should be present as the acyclic polyphosphoric acid. This acid has a substantially lower corrosion rate; about 2 to 3 mils per year at 125° F. Again, similar calculations on the 100 gram effluent sample indicate that this acid would have to be concentrated until at least 0.100 gram molecular weight of its $P_2O_5$ content were in the form of the acyclic polyphosphoric acid. The corrosion of this acid is intermediate that of the two previous samples; about 10 mils per year at 125° F. The foregoing example with the exemplified calculation will indicate to those skilled in the art how an anhydrous phosphoric acid can be obtained as a non-corrosive liquid by the step of cation exchanging the wet process acid prior to its concentration.

Table 4

| Impurity Content* | Feed | 50 gram effluent | 100 gram effluent |
|---|---|---|---|
| Aluminum | 2.56 | 1.80 | 2.56 |
| Iron | 0.75 | 0.70 | 0.75 |
| Magnesium | 0.08 | 0.03 | 0.05 |
| Zinc | 0.17 | 0.05 | 0.07 |
| Chromium | 0.14 | 0.14 | 0.14 |
| Vanadium | 0.18 | 0.08 | 0.18 |

*Amounts expressed are weight percents of the metals (calculated as oxides) in the acid samples.

In the appended claims as well as in the preceding description of the invention, acid concentrations are expressed in terms of $P_2O_5$ content; this is in accordance with conventional usage. While the invention has been described in terms of obtaining aqueous solutions of the ammonium salts of phosphoric acid it is of course obvious that it would also be applied to obtain water soluble salts, having neutral or alkaline pH values, of the alkali metals as well.

Other modes of applying the principle of my invention may be employed instead of those explained, change being made as regards the methods or materials employed, provided the step or steps stated by any of the following claims, or the equivalent of such stated step or steps, be employed.

I claim:

[ 1. An ammonium phosphate solution produced by neutralization with ammonia of wet-process phosphoric acid containing incident metallic impurities comprising iron and aluminum; said ammonium phosphate solution being free of gelatinous precipitates and metaphosphates and having:

(1) a pH between about 5.5 and about 10;

(2) between about 1 and about 40 weight percent phosphorus (calculated as $P_2O_5$), said phosphorus being present as a mixture of orthophosphate and acyclic polyphosphate;

(3) between about 0.3 and about 0.7 parts by weight of ammonium per part of $P_2O_5$;

(4) between about 1 and about 10 weight percent of said metallic impurities comprising iron and aluminum (calculated as the oxides), said impurities normally causing the formation of gelatinous precipitates in said ammonium phosphate solution; and (5) the amount of said acyclic polyphosphate being sufficient to prevent the formation of said gelatinous precipitates of said metallic impurities comprising iron and aluminum.]

[2. The liquid ammonium phosphate of claim 1 having about 8 weight percent nitrogen and about 24 weight percent phosphorus calculated as $P_2O_5$.]

[3. The liquid ammonium phosphate of claim 1 having about 11 weight percent nitrogen and about 33 weight percent phosphorus calculated as $P_2O_5$.]

[4. The ammonium phosphate solution of claim 1 wherein said impurities also comprise magnesium and wherein said acyclic polyphosphate also prevents the formation of insoluble salts of said magnesium impurity.]

5. The ammonium phosphate solution of claim 1 wherein the amount of said acyclic polyphosphate comprises at least 2 atomic weights of said phosphorus present as acyclic polyphosphate for each atomic weight of said iron and aluminum impurities.

[6. The ammonium phosphate solution of claim 1 which is obtained entirely by the neutralization with ammonium of wet-process phosphoric acid which has been concentrated to form said acyclic polyphosphate in situ.]

7. In the manufacture of ammonium phosphate from wet-process phosphoric acid containing between about 1 and about 10 weight percent of metallic and other incidental impurities, said impurities comprising iron and aluminum and causing the formation of precipitates and gelatinous bodies in said ammonium phosphate, the improved method of avoiding the formation of said precipitates and gelatinous bodies which comprises heating said acid *to a temperature greater than 120° C.*, [and] removing the volatilized impurities and sufficient water [from at least a portion thereof] *therefrom* to obtain *acyclic polyphosphoric acid in an amount sufficient to prevent the precipitation of all said metallic impurities upon neutralization of said acid, neutralizing said heat-treated acid with ammonia* [at least two atomic weights of phosphorus present as acyclic polyphosphoric acid for each atomic weight of aluminum and iron in said acid neutralizing said heat-treated acid with ammonia] and adding sufficient water to obtain an aqueous ammonium phosphate of the desired concentration.

8. The method of claim 7 where said acyclic polyphosphoric acid is obtained by passng *the entire bulk of* said wet-process acid through a heating zone wherein the bulk of said wet-process acid is heated to a temperature less than about 200° C., and [said] *a* portion of said acid is heated to a temperature greater than about 200° C.

9. The process for preparing aqueous ammonium phosphate which comprises: (1) heating to a temperature between about 120° C. and about 400° C. crude wet-process phosphoric acid of between about 25 and about 55 percent $P_2O_5$ concentration and containing between about 1 and about 10 weight percent of normally incident impurities including iron and aluminum which cause the formation of gelatinous products when said acid is reacted with ammonia to form aqueous ammonium phosphate; (2) removing the gaseous products which are evolved from the body of liquid acid during the course of said heating and forming an amount of polyphosphoric acid comprising at least two atomic weights of phosphorus per atomic weight of iron and aluminum present, and (3) reacting only the non-volatile products containing the non-volatile metal impurities so obtained with an aqueous ammonia solution of between about 10 and about 20 percent $NH_3$ concentration at a temperature between about 20° C. and about 100° C., the amount of ammonia employed being such that the product of said reaction has a pH value between about 6.5 and about 8.5.

10. The process for preparing aqueous ammonium phosphate from crude wet-process phosphoric acid of between about 35 and about 55 weight percent $P_2O_5$ content and containing between about 1 and about 10 weight percent of normally incident impurities including iron and aluminum which cause the formation of gelatinous precipitates when said acid is reacted directly with ammonia, which process comprises: (1) heating said acid at a temperature between about 120° C. and about 400° C. for a period of time sufficient to vaporize from said acid the components thereof which are volatile at said temperature and form an amount of polyphosphoric acid comprising at least two atomic weights of phosphorus per atomic weight of iron and aluminum present; (2) reacting the heat-treated acid containing the non-volatile metal impurities so obtained with ammonia at a temperature between about 150° C. and about 200° C.; and (3) adding sufficient water to the reaction product so obtained to form a solution containing between about 45 and about 50 percent by weight of ammonium phosphate; the amount of ammonia employed in step (2) being such that the solution obtained in step (3) has a pH value between about 6.5 and 8.5.

*11. A process for the production of a high-analysis liquid mixed fertilizer which comprises the steps of continuously feeding commercially available wet-process phosphoric acid containing up to about 54 weight percent $P_2O_5$ into evaporating means; continuously and simultaneously applying heat to said evaporating means; withdrawing from said evaporating means a highly concentrated, fluid, wet-process phosphoric acid substantially free of solids, containing about 65 to 70 weight percent $P_2O_5$, and containing in solution substantially all of the congeneric impurities ordinarily present in said commercially available wet-process acid fed to said evaporating means and sufficient acyclic polyphosphoric acid to prevent precipitation of said impurities upon neutralization of said acid with ammonia; cooling said concentrated*

*acid to a temperature of about 20° to 40° C.; subsequently introducing ammoniating fluid to said highly concentrated acid in quantity sufficient to raise the pH of the resulting solution to about 7; maintaining the resulting solution of unhydrolyzed ammonium salts at a temperature in the range from about 30° to 100° C. during introduction of said ammoniating fluid; and withdrawing the resulting solution as product.*

*12. A process for the production of high-analysis liquid mixed fertilizer which comprises the steps of continuously feeding commercially available wet-process phosphoric acid containing up to about 54 weight percent* $P_2O_5$ *into evaporating means; maintaining the material in said evaporating means at a temperature in the range from about 120° C. to about 400° C.; withdrawing from said evaporating means a highly concentrated, fluid, wet-process phosphoric acid substantially free of solids, containing about 65 to 70 weight percent* $P_2O_5$*, and containing in solution substantially all of the congeneric impurities originally present in said commercially available wet-process acid fed to said evaporating means; and sufficient acyclic polyphosphoric acid to prevent precipitation of said impurities upon neutralization of said acid with ammonia cooling said concentrated acid to a temperature of about 20° C. to 40° C.; subsequently introducing an ammoniating fluid to said highly concentrated acid in quantity sufficient to raise the pH of the resulting solution to about 7; maintaining the resulting solution of unhydrolyzed ammonium salts at a temperature in the range of about 30° C. to 100° C. during introduction of said ammoniating fluid; and withdrawing the resulting solution as product.*

* * * * *